HYBRID FEEDBACK AMPLIFIER

Filed Aug. 23, 1967 2 Sheets-Sheet 1

INVENTOR
D. H. KLOCKOW
BY R. B.
ATTORNEY

HYBRID FEEDBACK AMPLIFIER

Filed Aug. 23, 1967 2 Sheets-Sheet 2

United States Patent Office 3,487,325
Patented Dec. 30, 1969

3,487,325
HYBRID FEEDBACK AMPLIFIER
Dennis H. Klockow, Andover, Mass., assignor to Bell Telephone Laboratories, Incorporated, Murray Hill, N.J., a corporation of New York
Filed Aug. 23, 1967, Ser. No. 662,671
Int. Cl. H03f 1/36
U.S. Cl. 330—107 5 Claims

ABSTRACT OF THE DISCLOSURE

A hybrid feedback amplifier is disclosed including an autotransformer which connects the line, the amplifier, the amplifier feedback network and a terminating resistor so that the line and the feedback network comprise a conjugate pair.

BACKGROUND OF THE INVENTION

This invention relates to repeated coaxial transmission systems and, in particular, to hybrid feedback amplifiers used in the repeaters.

Repeaters are employed along a transmission line at fixed intervals to compensate for losses experienced by the transmitted signal due to the transmission line. Typically, these repeaters include a hybrid feedback amplifier at the input to the repeater or at the output of the repeater, which is designed so that the reflection of the transmitted signal is minimized, thus minimizing transmission distortion.

Hybrid feedback amplifiers are well known in the art and are shown, for example, on p. 822 of the July-August 1966 Bell System Technical Journal and in "Junction Transistor Circuit Analysis" by S. S. Hakim, published by Wiley & Company (1962), pp. 273–278. These amplifiers commonly include a standard isolation type transformer which is used to connect the line and feedback network of the amplifier to form one conjugate pair and the amplifier and a terminating resistor to form a second conjugate pair. The coaxial line and terminating resistor each have one side connected to the transformer and the other to ground. When the hybrid amplifier is used as the input of the repeater, the input circuit of the amplifier is connected to the transformer, as is one side of the feedback network. The common connecion between the other sides of the input circuit and feedback network provides a low impedance path to ground. When the hybrid feedback amplifier is used as the output stage of the repeater, the output circuit of the amplifier is connected to the transformer, as is one side of the feedback network. A low impedance path to ground exists at the interconnection of the other sides of the amplifier and feedback network.

The prior art feedback amplifier described above exhibits limited high frequency response. Since the transformer is connected between the feedback network and the amplifier, it is connected in the feedback path and limits the high frequency response because of its own frequency characteristics.

Autotransformers may exhibit a better high frequency response and, therefore, may be desirable for use in hybrid feedback amplifiers requiring better high frequency responses than that attainable with prior art devices. The substitution of an autotransformer in place of the standard isolation transformer in hybrid feedback amplifiers would fail to result in an operative hybrid feedback amplifier.

Therefore, an object of the present invention is to permit an autotransformer to be used in a hybrid feedback amplifier.

Another object of the present invention is to permit an autotransformer to be used in a hybrid feedback amplifier, which amplifier may serve as the input and output stages of the repeater.

An additional object of the present invention is to improve the frequency response of a hybrid feedback amplifier.

SUMMARY OF THE INVENTION

In accordance with the present invention, these objects are accomplished by including an autotransformer in a hybrid feedback amplifier, which autotransformer connects the line and the feedback network of the amplifier to form a conjugate pair and the amplifier and a terminating resistor, which is floating with respect to ground. The autotransformer is connected in the feedback path of the hybrid amplifier since it is connected between the feedback circuit and the amplifier. The autotransformer may have a better high frequency response than the standard isolation transformer and, therefore, the hybrid amplifier also may have an improved high frequency response.

The autotransformer, which is arranged to provide unequal power division in embodiments of the invention, includes three terminals. The first terminal is connected to the non-grounded side of the carrier line; the second is connected to the amplifier; and the third is connected to the amplifier feedback network. The connection between the amplifier and the feedback network serves as a low impedance path to ground. Therefore, the amplifier, the feedback network, and the carrier line have a substantially common ground, as is found in the prior art hybrid feedback amplifier. But, in the present invention, a floating terminating resistor is connected between the second and third terminals, permitting the autotransformer to be used in the feedback amplifier.

When the hybrid feedback amplifier is used as an input stage of the repeater, the second terminal is connected to the input circuit of the amplifier. The hybrid feedback amplifier may, alternatively, serve as the output stage of the repeater, with the output circuit of the amplifier connected to the second terminal.

The input impedance of the repeater seen by the line is designed to match the line impedance in order to obtain maximum power transfer from the line to the repeater. This impedance consists of the deflected terminating resistor in series with the input impedance of the amplifier. The impedance relationship between the reflected resistor and amplifier may permit maximization of the power transferred to the amplifier and minimization of the dissipation in the reflected resistor. In addition, the input impedance of the repeater seen by the line is relatively fixed when using hybrid feedback amplifiers due to the feedback of the hybrid amplifier.

One type of autotransformer that may be used in the practice of the present invention is described in Patent No. 3,037,173, issued to C. L. Ruthroff on May 29, 1962. A twisted wire autotransformer is disclosed in the Ruthroff patent which exhibits improved high frequency response. When this autotransformer is used in the present invention, the high frequency response of the hybrid feedback amplifier also is improved.

DETAILED DESCRIPTION

Prior art hybrid feedback amplifiers included a standard isolation transformer, as previously described. This standard isolation transformer has a limited high frequency response and consequently limits the high frequency response of the hybrid feedback amplifier. An autotransformer may have a wider frequency response than that of standard isolation transformers and, therefore, it would be desirable to use an autotransformer in place of the standard isolation transformer in hybrid feedback amplifiers. Mere substitution of an autotransformer for the former isolation transformer would, however, produce an inoperative device absent the present invention.

Figure 1:
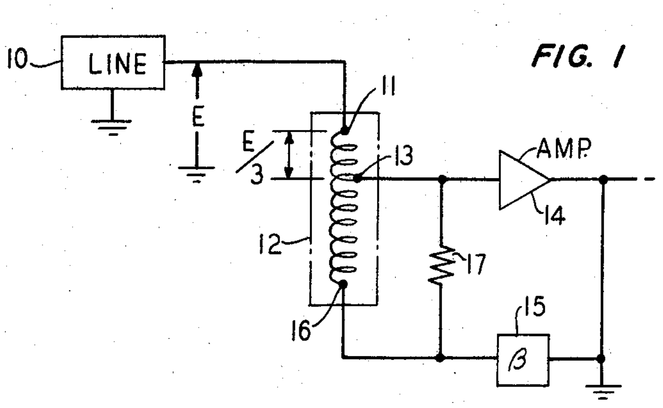
FIG. 1 is a block diagram of a hybrid feedback amplifier, including an autotransformer, where the amplifier may be used as the input stage of a repeater.

FIG. 1 is a symbolic block diagram of an embodiment of the present invention. The hybrid feedback amplifier including an autotransformer, shown in FIG. 1, may be used as the input stage of a repeater. Line 10, which carries the transmitted signal, is connected to one terminal 11 of the autotransformer 12. A second terminal 13 of the autotransformer is connected to the input stage of amplifier 14. The amplifier feedback network 15 is connected between the amplifier and a third terminal 16 of the autotransformer. Terminating resistor 17 is connected between terminals 13 and 16 of the autotransformer.

The autotransformer connects the line 10, the feedback network 15, the input circuit of the amplifier 14 and the terminating resistor 17. The feedback network 15 and the line are connected to form a conjugate pair.

The operation of the system represented in FIG. 1 can most easily be understood by assuming a voltage E supplied to the autotransformer terminal 11 by line 10. A voltage $E/3$ may be developed between terminals 11 and 13 while a voltage $2E/3$ is developed between terminal 13 and ground in accordance with the turns ratio of the autotransformer and the relative impedance values of resistor 17 and the input circuit of amplifier 14. The point of interconnection between the amplifier 14 and the feedback network 15 is a low impedance path to ground. Consequently, an approximation may be made that this interconnection point is at ground. Therefore, $2E/3$ is developed across the amplifier 14. The turns ratio of the autotransformer 12 may be designed so that the voltage developed across terminals 13 and 16 is also equal to $2E/3$. Consequently, the voltage across the feedback network 15 is zero. Since the line and feedback network are conjugate pairs, no voltage is developed across the feedback network when a voltage is impressed by the line.

Terminating resistor 17 may be used to match the impedance of the line since the impedance presented to the line is the series connection of the reflected terminating resistor and the input impedance of the amplifier 14. The impedance relationship between the reflected terminating resistor and the input impedance of the amplifier may be designed to maximize the power transferred to the amplifier.

The present arrangement permits an autotransformer to be used in a hybrid feedback amplifier. In prior hybrid feedback amplifiers, the line, feedback network, input circuit of the amplifier, and terminating resistor were connected to a common ground. In embodiments of the present invention, the terminating resistor is floating with respect to ground since it is connected between terminals 13 and 16 of the autotransformer.

The autotransformer is connected in the feedback path of the hybrid feedback amplifier since it is connected between the feedback network and the input circuit of the amplifier. Since an autotransformer may have a higher frequency response than a standard isolation transformer, the hybrid feedback network also may exhibit a wider frequency response.

Figure 2:
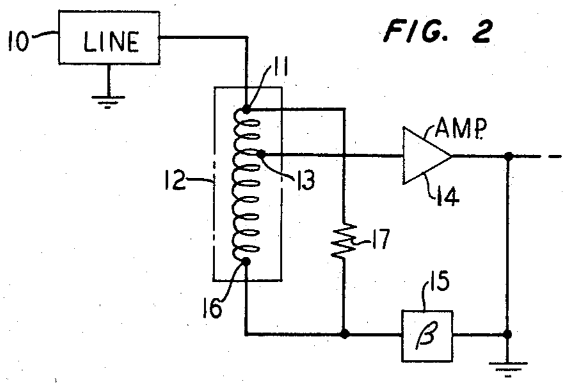
FIG. 2 is similar to FIG. 1 except that the terminating resistor is connected across the entire autotransformer.

FIG. 2 is a symbolic block diagram of another embodiment of the present invention where a hybrid feedback amplifier including an autotransformer may be used as the input stage of a repeater. The components of the hybrid feedback amplifier shown in FIG. 2 are the same as those shown in FIG. 1 and thus are similarly designated. The only difference between the two figures resides in the connection of the terminating resistor to the autotransformer. In FIG. 2, the terminating resistor is placed across the entire auto transformer, while in FIG. 1, the terminating resistor is placed across a part of the autotransformer. When the terminating resistor is connected across the entire autotransformer, as in FIG. 2, a portion of the terminating resistor is reflected through the mutual coupling of the autotransformer into the feedback path of the amplifier. The inductive coupling of this additional resistance limits the frequency response of the hybrid feedback amplifier. The value of a terminating resistor will be different in the above figures, depending upon its interconnection since it is used, in part, to match the impedance of the line.

Figure 3:
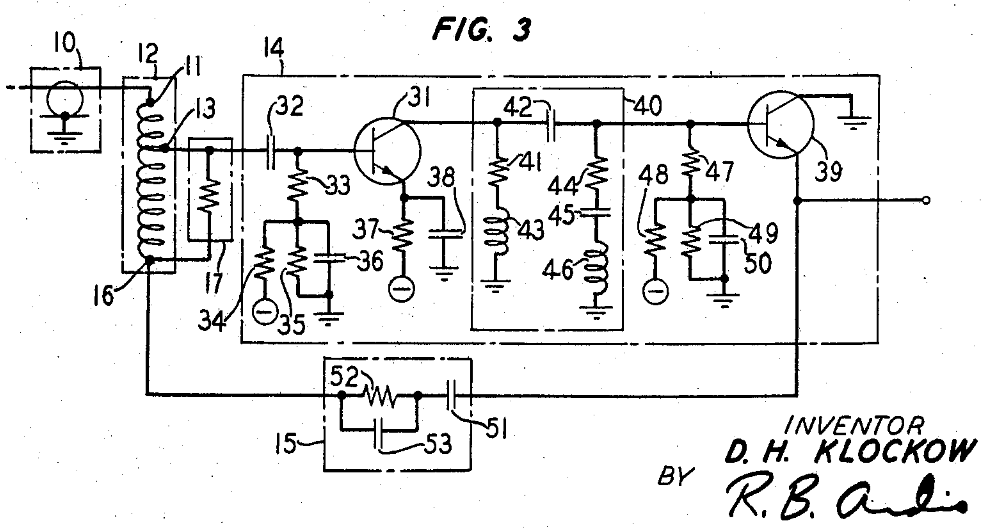
FIG. 3 is a schematic diagram of a hybrid feedback amplifier, including an autotransformer, where the amplifier may be used as the input stage of a repeater.

FIG. 3 is a schematic diagram of an embodiment of the present invention in which a hybrid feedback amplifier includes an autotransformer. The blocked out components of FIG. 3 are similar to those of FIG. 1 and are similarly designated. In FIG. 3, the line 10 is connected to one terminal 11 of the autotransformer 12. A second terminal 13 of the autotransformer 12 is connected to the input circuit of amplifier 14. The feedback network 15 is connected to the third terminal 16 of the autotransformer and a terminating resistor 17 is connected between terminals 13 and 16 of the autotransformer.

The second terminal of the autotransformer is connected to the base of an n-p-n transistor 31 through coupling capacitor 32. Resistor 33 is also connected to the base of transistor 31. The other side of resistor 33 is connected to a source of negative reference potential through resistor 34 and to ground through a parallel combination of resistor 35 and bypass capacitor 36. Resistors 33, 34 and 35 are bias resistors for transistor 31 which is connected in the common emitter mode. The emitter of transistor 31 is connected to a source of negative reference potential through load resistor 37. Bypass capacitor 38 is connected between the emitter of transistor 31 and ground.

The collector of transistor 31 is connected to a second n-p-n transistor 39 through wave-shaping network 40. The collector of transistor 31 is connected to resistor 41 and capacitor 42. The other side of resistor 41 is connected to ground through inductor 43. The other side of capacitor 42 is connected to ground through the series connection of resistor 44, capacitor 45 and inductor 46. Resistors 41 and 44, capacitors 42 and 45, and inductors 43 and 46 form a wave-shaping network for the transmitted signal. The other side of capacitor 42 is connected to the base of transistor 39, which is connected in a common collector mode, with the collector being connected to ground. One side of resistor 47 is connected to the base of transistor 39. The other side of resistor 47 is connected to a point of negative reference potential through resistor 48 and to ground through a parallel combination of resistor 49 and bypass capacitor 50. Resistors 47, 48 and 49 serve to bias transistor 39.

A feedback circuit 15 is connected between the emitter of transistor 39 and the third terminal 16 of the autotransformer. One side of capacitor 51 is connected to the emitter terminal of transistor 39 while the other side of capacitor 51 is connected to the third terminal 16 of the autotransformer through the parallel combination of resistor 52 and capacitor 53. Resistor 52 and capacitors 51 and 53 form the feedback network 15.

In FIG. 1, an approximation was made that from the interconnection point between amplifier 14 and feedback network 15 there was a low impedance path to ground. This low impedance path to ground is provided, as shown in FIG. 3, through the common collector configuration of transistor 39.

The hybrid feedback amplifier has been described with reference to its use as the input stage of a repeater. The advantages of this amplifier may also be secured by using it at the output stage of the repeater.

Figure 4:
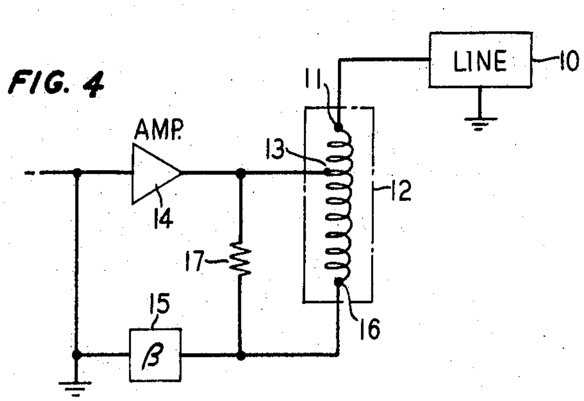
FIG. 4 is a block diagram of a hybrid feedback amplifier, including an autotransformer, where the amplifier may be used as the output stage of a repeater.

FIG. 4 is a symbolic block diagram of an embodiment of the present invention in which a hybrid feedback amplifier which includes an autotransformer may be used as the output stage of a repeater. Since the components of the hybrid feedback amplifier, when used as the output stage of the repeater, are similar to the components of the amplifier when used as an input stage for the repeater, as shown in FIG. 1, like elements will be so designated. The line 10 which is fed by the repeater is connected to one terminal 11 of autotransformer 12. A second terminal 13 is connected to the output circuit of amplifier 14. The feedback network 15 is connected between the other side of amplifier 14 and a third terminal 16 of autotransformer 12. Terminating resistor 17 is connected between terminals 13 and 16. The interconnection point between the feedback network 15 and the amplifier 14 is shown to be at ground. As in FIG. 1, this is an approximation since the interconnection point provides a low impedance path to ground.

The operative principles of FIG. 4 are similar to those of FIG. 1. Thus, the autotransformer connects line 10 and feedback network 15 to form a conjugate pair.

Figure 5:
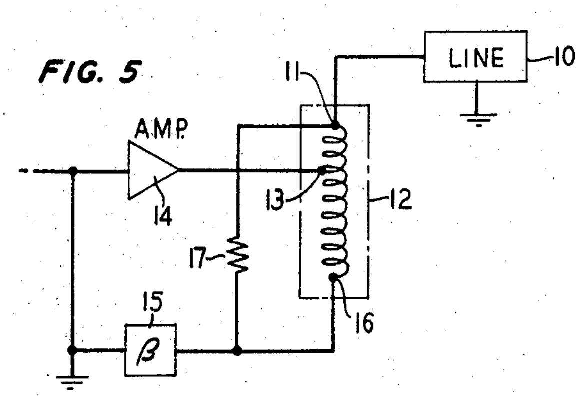
FIG. 5 is similar to FIG. 4 except that the terminating resistor is connected across the entire autotransformer.

FIG. 5 is a symbolic block diagram of another embodiment of the present invention where a hybrid feedback amplifier which includes an autotransformer may be used as the output stage of a repeater. The components of the hybrid feedback amplifier shown in FIG. 5 are the same as those shown in FIG. 4 and are similarly designated. The only difference between the two figures resides in the connection of the terminating resistor with the autotransformer. In FIG. 5, the terminating resistor is placed across the entire autotransformer between terminals 11 and 16, while in FIG. 4, the terminating resistor is placed across a part of the autotransformer between terminals 13 and 16. When the terminating resistor is connected across the entire autotransformer, as in FIG. 5, the terminating resistor is reflected through the autotransformer into the feedback path of the amplifier. The impedance transforming properties of an autotransformer are normally degraded at high frequencies. Consequently, this configuration limits the frequency response of the hybrid feedback amplifier. The value of the terminating resistor will be different in FIGS. 4 and 5, depending upon its interconnection, since it is used, in part, to match the impedance of the line.

Figure 6:
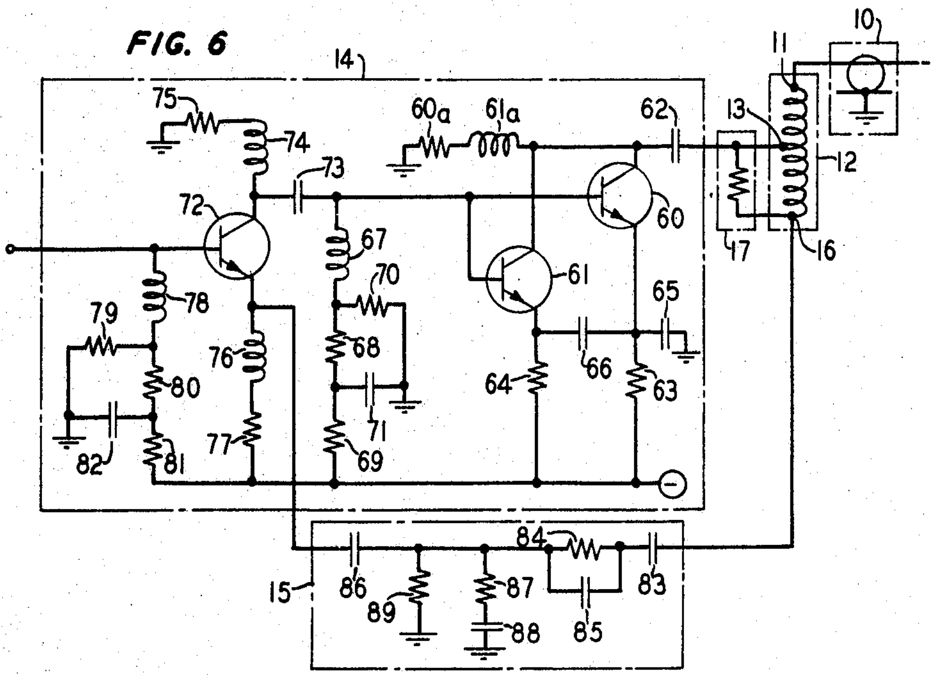
FIG. 6 is a schematic diagram of a hybrid feedback amplifier, including an autotransformer, where the amplifier may be used as the output stage of a repeater.

FIG. 6 is a schematic diagram of an embodiment of the present invention where a hybrid feedback amplifier utilizing an autotransformer may serve as the output stage of a repeater. Since FIG. 6 is a more detailed representation of the system shown in FIG. 4, similar elements are so designated. The line 10 is connected to one terminal 11 of autotransformer 12. A second terminal 13 of autotransformer 12 is connected to the output stage of amplifier 14. Feedback network 15 is connected between the third terminal 16 of the autotransformer and the other side of amplifier 14. A terminating resistor 17 is connected between autotransformer terminals 13 and 16.

The collectors of the n-p-n output transistors 60 and 61 which are coupled together, are connected to ground through the series connection of load resistor **60*a* and wave-shaping inductor 61*a* and are coupled to terminal 13 through capacitor 62. The emitter of transistor 60 is connected to a source of reference potential through load resistor 63 and the emitter of transistor 61 is connected to a source of reference potential through load resistor 64. Bypass capacitor 65 is connected between the emitter of transistor 60 and ground and bypass capacitor 66 is connected between the emitters of transistors 60 and 61. The bases of transistors 60 and 61 are connected together and are connected to one side of inductor 67. The other side of inductor 67 is coupled to a source of reference potential through the series connection of resistors 68 and 69. The other side of inductor 67 is also coupled to ground through resistor 70. Bypass capacitor 71 is connected between the interconnection of resistors 68 and 90 and ground. Inductor 67 may be used as a wave-shaper. The bases of transistors 60 and 61 are coupled to the collector of n-p-n transistor 72 through coupling capacitor 73. The collector of transistor 72 also is connected to ground through the series connection of inductor 74 and resistor 75. The emitter of transistor 72 is connected to a source of reference potential through inductor 76 and emitter resistor 77. The base of transistor 72 is connected to one side of inductor 78. The other side of inductor 78 is connected to ground through biasing resistor 79 and to a source of reference potential through the series connection of biasing resistors 80 and 81**.

Bypass capacitor 82 is connected between the junction of resistors 80 and 81 and ground. Inductors 74, 76 and 78 are primarily used for wave-shaping purposes.

The feedback network 15 is connected between the third terminal 16 of the autotransformer and the emitter of transistor 72. Autotransformer terminal 16 is connected to one side of capacitor 83. The other side of capacitor 83 is connected in series with a parallel combination of resistor 84 and capacitor 85. The other side of the parallel combination is coupled to the emitter of transistor 72 through capacitor 86. The other side of the parallel combination is also coupled to ground through the series connection of resistor 87 and capacitor 88 and through resistor 89.

In FIG. 4, an approximation was made that from the interconnection point between feedback network 15 and amplifier 14 there was a low impedance path to ground. In FIG. 6, the low impedance path to ground is through transistor 72.

The operation of the present invention has been described with reference to a repeated transmission line. The present hybrid feedback amplifier is not limited to that environment and may find application where the advantages of a hybrid feedback amplifier are needed.

It is to be understood that the embodiments of the invention which have been described are merely illustrative of the application of the principles of the invention. Numerous modifications may readily be devised by those skilled in the art without departing from the spirit and scope of the invention.

What is claimed is:

1. A hydbrid feedback amplifier of the type in which an autotransformer having a winding and a center tap dividing said winding into portions is used to connect a signal carrying network to said amplifier,
   - said amplifier including an amplifying section and a feedback network,
   - means for connecting said signal carrying network across essentially the series combination of said winding and said feedback network.
   - means for connecting said amplifying section across one portion of said winding and said feedback network, and
   - a terminating resistor connected across at least a part of said winding having such value that the signal on said signal carrying network appears as substantially equal voltages across said one portion and across the series combination of said one portion and said feedback network with a zero net signal voltage across said feedback network.

2. The hybrid feedback amplifier according to claim 1 wherein said terminating resistor is connected across said winding.

3. In combination, an amplifier having an input and an output and a feedback loop including an impedance network connected from said output to said input, an autotransformer having a winding and a center tap dividing said winding into two portions, with one of said portions connected in series in said feedback loop, a signal carrying path connected across essentially said winding and said impedance network, and a terminating resistor connected across at least said one portion having such value that the voltage on said signal carrying path appears totally across the two portions of said winding to the exclusion of said impedance network.

4. The amplifier according to claim 3 wherein said one portion of said winding in said feedback loop is connected to said amplifier input.

5. A hybrid feedback amplifier comprising in combination a transformer winding, a terminating resistor shunting at least a part of said winding, an impedance network connected to one end of said winding, means for connecting a signal carrying network across essentially the series combination of said winding and said impedance network, an amplifier having a feedback loop, means for connecting said impedance network in series in said loop so that said impedance network becomes the feedback impedance of said amplifier and for connecting that portion of said winding in series in said loop for which a signal on said signal carrying network appears as a voltage across said portion in series in said loop that is equal to the voltage across the series combination of said portion and said feedback impedance with a zero net voltage across said feedback impedance.

References Cited

UNITED STATES PATENTS

| | | | |
|---|---|---|---|
| 2,302,798 | 11/1942 | Percival | 330—75 X |
| 3,071,735 | 1/1963 | Tongue | 330—195 X |

OTHER REFERENCES

Webster's Seventh New Collegiate Dictionary, G & C. Merriam Company, Springfield, Mass., 1963, p. 176.

ROY LAKE, Primary Examiner

JAMES B. MULLINS, Assistant Examiner

U.S. Cl. X.R.

330—28, 87, 189, 196